United States Patent [19]
Burke et al.

[11] Patent Number: 5,155,684
[45] Date of Patent: Oct. 13, 1992

[54] GUIDING AN UNMANNED VEHICLE BY REFERENCE TO OVERHEAD FEATURES

[75] Inventors: Steven A. Burke, Champlin, Minn.; Cao Z. Liang, Tianjin, China; Ernest L. Hall, Cincinnati, Ohio

[73] Assignee: Tennant Company, Minneapolis, Minn.

[21] Appl. No.: 732,340

[22] Filed: Jul. 17, 1991

Related U.S. Application Data

[63] Continuation of Ser. No. 262,281, Oct. 25, 1988, abandoned.

[51] Int. Cl.⁵ .................... G06E 15/50; G01C 21/00; G06F 15/64
[52] U.S. Cl. .................. 364/424.02; 364/447; 318/587; 382/16
[58] Field of Search .............. 364/424.01, 424.02, 364/443, 460, 449, 448, 432, 513, 447; 180/167, 168, 169; 318/587; 901/1; 382/16

[56] References Cited

U.S. PATENT DOCUMENTS

| | | | |
|---|---|---|---|
| 3,010,129 | 11/1961 | Moore | 15/1 |
| 3,713,505 | 1/1973 | Muller | 180/79 |
| 3,789,939 | 2/1974 | Geislinger | 180/6.5 |

(List continued on next page.)

FOREIGN PATENT DOCUMENTS

| | | | |
|---|---|---|---|
| 146428 | 10/1984 | European Pat. Off. | |
| 247014 | 5/1987 | European Pat. Off. | |
| 273976 | 5/1987 | European Pat. Off. | |
| 3536974 | 10/1985 | Fed. Rep. of Germany | |
| 89213 | 5/1985 | Japan | |
| 0221910 | 10/1986 | Japan | 318/587 |

OTHER PUBLICATIONS

Self Running Floor Cleaning Robot AS-100, Auto Sweepy from Toshiba, Jan. 1986.
Jan. 19, 1988 Memo & Attachments re Robotics Presentation, San Francisco.
"Entering a New Phase in the Development of Cleaning Robots", Shoichi Asaji; Services; Dec. 1987.
"Mobile Robots" by Richard K. Miller ©1987.
Article "Look, Ma! No Driver"; Jim Schefter; Poplar Science; Oct. 1985.
TRC Helpmate; Transition Research Corp; Newsweek; Mar. 28, 1988.
Automated Vehicle with Artificial Eyes; JSAE Review; Nov. 1984.
Wall Street Journal Dec. 28, 1987, "Security Robot Thwarts Its First Break-In".
"First Practical Domestic Robot May Be a Lawnmower", Machine Design, Jul. 24, 1986.
"Omnidirectional Dynamic Guidance for Mobile Robots", by Cao & Hall; Oct. 1986.
Caterpillar Bulletin; Apr. 1986.
Lasernet "The Smart Sensor" Bulletin; ©1986.
Fortune article, Sep. 14, 1987 "Invasion of the Service Robots".
Newsweek article, Mar. 28, 1988 "Robots Find Their Place".

*Primary Examiner*—Parshotam S. Lall
*Assistant Examiner*—Michael Zanelli
*Attorney, Agent, or Firm*—Kinzer, Plyer, Dorn, McEachran & Jambor

[57] ABSTRACT

A vehicle primarily for unmanned operation is equipped with a video camera pointed up, and progressively records in an on-board computer memory the observed locations of points derived from overhead features such as pre-existing overhead lights in a building during a manually driven teaching mode trip along a desired course. On subsequent unmanned trips, the vehicle directs itself along the chosen course by again observing the overhead features, deriving points from them and comparing the locations of those points to the locations of the points that were recorded during the teaching mode trip. It then corrects its steering to bring the errors between the observed locations and the recorded locations to zero, thereby directing the vehicle to automatically follow the course that was followed during the teaching mode trip.

43 Claims, 10 Drawing Sheets

U.S. PATENT DOCUMENTS

| | | | |
|---|---|---|---|
| 3,952,361 | 4/1976 | Wilkins | 15/319 |
| 3,970,840 | 7/1976 | De Bruine | 250/202 |
| 4,003,445 | 1/1977 | De Bruine | 180/98 |
| 4,028,533 | 6/1977 | Matsubara | 235/151 |
| 4,099,669 | 7/1978 | Cortopassi | 239/11 |
| 4,114,711 | 9/1978 | Wilkins | 180/6.5 |
| 4,278,142 | 7/1981 | Kono | 180/168 |
| 4,309,758 | 1/1982 | Halsall | 364/424 |
| 4,328,545 | 5/1982 | Halsall et al. | 364/424 |
| 4,413,210 | 11/1983 | Gronau | 318/16 |
| 4,465,155 | 8/1984 | Collins | 180/169 |
| 4,500,970 | 2/1985 | Daemmer | 364/513 |
| 4,530,057 | 7/1985 | Ahlbom | 364/424 |
| 4,541,049 | 9/1985 | Ahlbom | 364/424 |
| 4,566,032 | 1/1986 | Hirooka | 358/103 |
| 4,573,547 | 5/1986 | Yoshimura | 180/168 |
| 4,613,804 | 9/1986 | Swenson | 318/587 |
| 4,626,995 | 12/1986 | Lofgren et al. | 364/424 |
| 4,628,453 | 12/1986 | Kamejima | 364/424 |
| 4,630,109 | 12/1986 | Barton | 358/103 |
| 4,647,784 | 3/1987 | Stephens | 250/561 |
| 4,652,803 | 3/1987 | Kamejima et al. | 364/424.02 |
| 4,665,487 | 5/1987 | Osawa | 364/424 |
| 4,670,648 | 6/1987 | Hall | 250/441 |
| 4,700,427 | 10/1987 | Knepper | 15/319 |
| 4,772,832 | 9/1988 | Okazaki et al. | 364/424.02 |
| 4,773,018 | 9/1988 | Lundström | 364/443 |
| 4,779,203 | 10/1988 | McClure et al. | 364/424.02 |
| 4,790,402 | 12/1988 | Field et al. | 364/424.02 |
| 4,819,169 | 4/1989 | Saitoh et al. | 364/424.02 |
| 4,837,487 | 6/1989 | Kurakake et al. | 364/513 |
| 4,843,565 | 6/1989 | Rose | 364/513 |
| 4,905,151 | 2/1990 | Weiman et al. | 364/424.02 |
| 4,933,864 | 6/1990 | Evans, Jr. et al. | 364/449 |

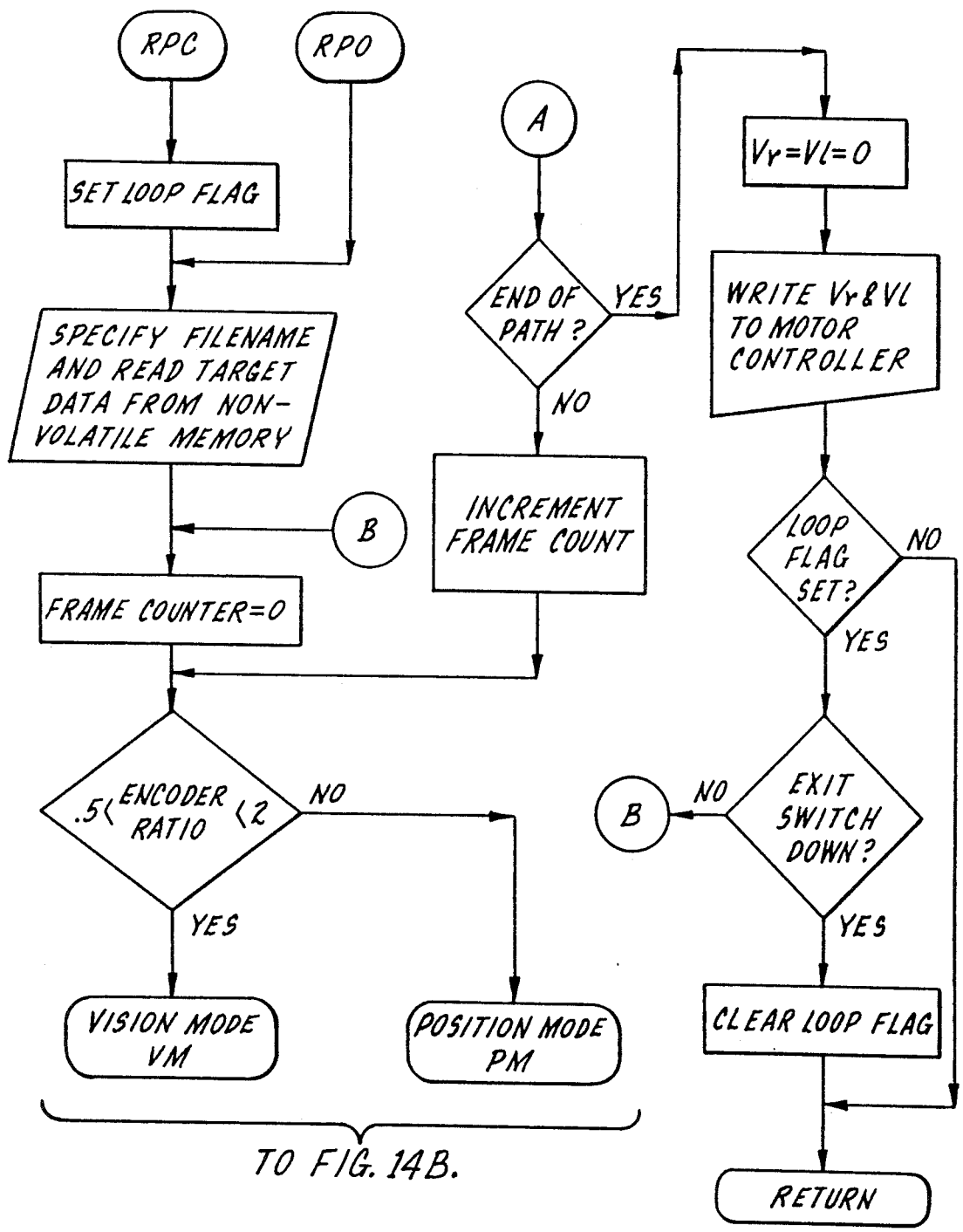

GUIDING AN UNMANNED VEHICLE BY REFERENCE TO OVERHEAD FEATURES

This is a continuation of copending application Ser. No. 07/262,281 filed on Oct. 25, 1988 now abandoned.

BACKGROUND

In the field of vehicle development, more and more interest is being focused on vehicles that can operate automatically without a driver. Automatic guided vehicles are used extensively in material handling, and there is keen interest in developing them for a range of other uses which is limited only by the imagination. A means for guiding such vehicles along a desired course is a first requirement.

The use of a fixed guideway is currently the most common technique. A signal-carrying wire may be buried in the floor and the vehicle made to follow it by on-board inductive coils. Such systems work well but are expensive to install or re-route. Sometimes a reflective stripe is painted on the floor and the vehicle is equipped with a photoelectric device to sense the stripe and direct the vehicle to follow it. These systems work also, but the floor stripes are subject to wearing off by traffic, which degrades the performance of the system, and they are inconvenient to re-route.

A recent trend is toward guiding a vehicle with a laser beam. Typically a laser-emitting unit is mounted on the vehicle, and its beam is reflected back to the vehicle from established targets in known locations to provide the information needed to guide the vehicle. Such a system is described in U.S. Pat. No. 4,647,784, for example. But while laser systems eliminate fixed guideways, they still require the installation of special targets. This entails some expense and inconvenience when installing or relocating them, and the targets may not be aesthetically appealing.

A preferred approach is an unmanned vehicle equipped to guide itself along a selected route without the need to install guideways or targets or any other special equipment in its work area. Ideally it would be able to guide itself by referring only to pre-existing features in its surroundings as landmarks. The present invention is an unmanned vehicle which guides itself by reference to overhead visual targets such as pre-existing overhead lights. Since overhead lights are universally found in commercial and industrial buildings, this vehicle when used in such buildings meets the need for an unmanned guidance system that does not require the installation of any special equipment in the work area.

SUMMARY OF THE INVENTION

This invention discloses an unmanned vehicle comprised of two drive wheels and two free swiveling caster wheels supporting a chassis which contains the elements necessary to power, propel and steer it. The chassis also contains or supports elements which repeatedly determine its position relative to a desired path and, based on these determinations, control its steering so that it follows a pre-selected course.

The vehicle of the present invention is primarily intended for use in industrial or commercial buildings, e.g. factories, warehouses, offices, schools, hospitals, stores, etc., which have pre-existing overhead lights. The vehicle, when operating in an unmanned mode, senses the presence of the overhead lights along its course with an on-board video camera. Other on-board equipment repeatedly samples the video image, converts it into a point location at the median center of each light and provides successive (x,y) coordinate locations of these points as the vehicle moves along. These observed locations are compared by an on-board computer to successive locations obtained in a similar fashion and stored in on-board memory during a preparatory or teaching mode trip previously made along the selected route. During the teaching mode trip the machine was manually driven precisely along the desired route so the successive locations obtained and stored at that time were along the correct course. During unmanned operation, which is referred to as repeat mode operation, any variance of the observed locations from the previously recorded locations will produce a steering correction that will bring the vehicle back to the intended course. The machine corrects its course at less than one-second intervals, so course errors never become large before they are corrected, with the result that the machine follows the predetermined course very accurately.

Because the machine uses pre-existing overhead lights as landmarks, it is not necessary to install any special features in the building to guide it, such as floor wires, floor stripes or reflective targets, so the installation costs of prior art systems are avoided. The programmed route can be changed when desired by manually driving along a new route and loading a new sequence of light locations into the on-board computer memory. It is not necessary to re-locate any guidance devices within the building, so route changes can be economically accomplished.

The machine disclosed herein has no functional capability beyond its ability to move automatically along a predefined course. However, it will be recognized by anyone skilled in the art that vehicles serving a host of functions could be made to operate without attendants if they had the guidance capability of this vehicle added to their own functional capabilities. The technology disclosed herein may be incorporated into any self powered vehicle operating along a repetitive path in a lighted building or other area having overhead lights or other overhead features having sufficient visual contrast with their backgrounds to be distinguishable by the vision system. A few examples are mobile robots, floor maintenance machines such as sweepers, scrubbers and burnishers, fork lift trucks and self powered carts for delivering various loads such as mail around office buildings, food trays in hospitals, or material and parts in factories.

BRIEF DESCRIPTION OF THE DRAWINGS

FIG. 3 shows the coordinate system used to define the error of a vehicle's actual position relative to its desired path and a reference position along that path.

FIG. 4 shows the coordinate system for locating the center point of the image of an overhead light in the camera's field of view, with the origin of coordinates (x,y) at the upper left corner of the video image, and the optical center of the camera located at (xc, yc).

FIG. 5 is a plan view showing real world coordinates of the center point of an overhead light or target with the origin of axes (x,y) at the optical centerline of the camera.

FIG. 6 is a sketch in elevation view taken along view line 6—6 of FIG. 5 showing the geometry of an overhead light on the ceiling and its image on the camera focal plane.

FIGS. 14A and 14B together constitute a flow chart of the repeat path subroutine, showing options for one time or continuous looping on a selected path.

DESCRIPTION OF THE INVENTION

General

Figure 1:
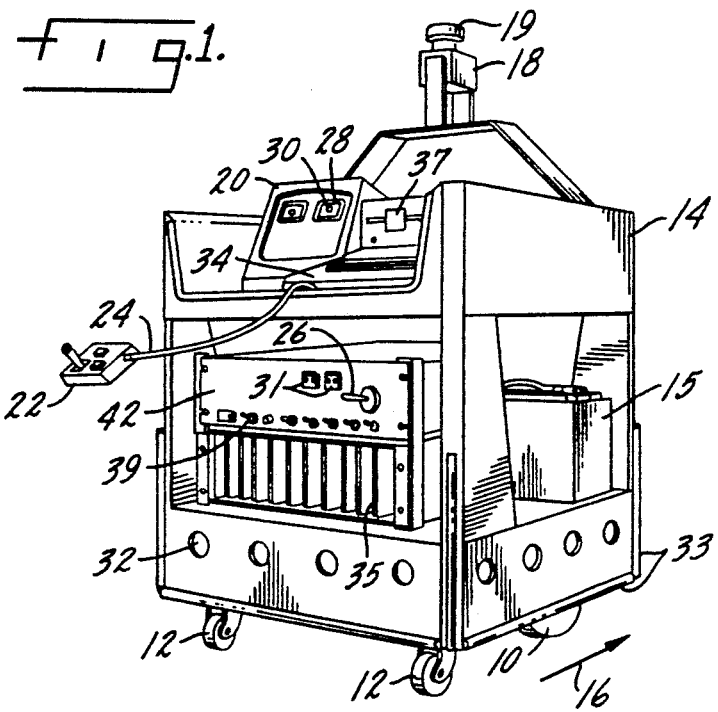
FIG. 1 is a perspective view of a vehicle which is equipped with the guidance system of this invention.

Referring to FIG. 1, there is shown a vehicle embodying the present invention. It has two drive wheels 10 (one not shown) and two free swiveling caster wheels 12 which together with the drive wheels support the weight of the vehicle. It has a sheet metal chassis 14 which supports and largely encloses the essential elements of the machine. Two 12-volt lead acid batteries 15 (only one shown) supply 24-volt power for the machine. Normal forward travel is in the direction of arrow 16.

There are manual controls which are accessible to a person standing or walking behind the machine. These comprise a joystick 22 on a pigtail 24 and various panel switches. With the joystick a person can manually maneuver the machine through any desired course during the teaching mode, position it again at approximately the same initial position to start a repeat mode trip, and manually maneuver it for incidental reasons, e.g. moving from a storage area to a work area, or for maintenance.

Card cage 35 mounts a number of circuit boards which include the motor controller, the power amplifiers for the drive motors, 5 and 12-volt power supplies, and master on-off switches.

Around the base of the machine chassis are a number of ultrasonic ranging sensors 32. One of the requirements for an unmanned vehicle is that it shall not collide with other objects which may be unexpectedly in its path. The ultrasonic devices act to sense the presence of such objects and prevent the machine from hitting them. As a further precaution, strip switches 33 on the sides and corners of the vehicle will stop the machine if they contact anything. These safety features, however, are not a part of the guidance system which is the subject of this patent, so will not be discussed further.

A computer 34 is required, which may be an Apple II+ personal computer with 48K of RAM and one disc drive 37 for a 5.25-inch floppy disc. Other computers could be used, and any non-volatile memory could be used in place of the floppy disc, e.g. magnetic tape, hard disc, EEPROM, or battery backed RAM.

The Vision Subsystem

Figure 2:
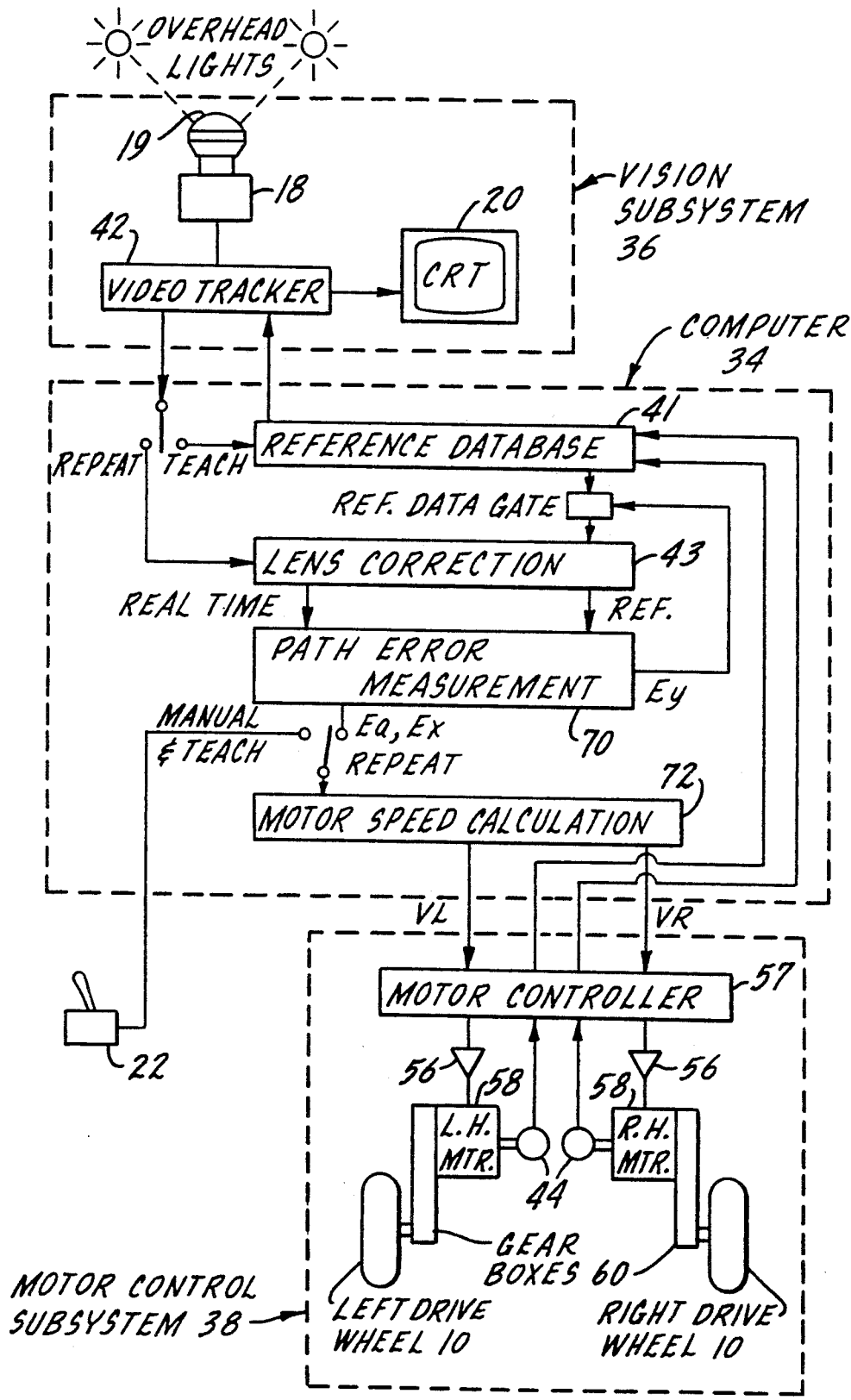
FIG. 2 is a block diagram showing schematically the control system of the machine.

This subsystem is shown diagrammatically as 36 in FIG. 2, and its elements are shown pictorially in FIG. 1. A commercially available video camera 18 is mounted on top of the machine and aimed straight up. Its purpose is to provide an image of overhead lights or other features generally above the machine. The preferred embodiment of this guidance system requires at least two overhead features in the field of view at all times, so the camera must be equipped with a lens 19 having a wide enough field of view to do this. It has been found that a lens having a field of view of about 90 degrees is needed to function with the lights in a typical factory. A C-mount lens with a focal length of 3.8 mm has been found to be satisfactory. The location of the camera on the machine is such that a downward extension of its optical centerline, which is vertical, intersects and bisects the axis connecting the centers of the two drive wheels. This geometry is used because it permits the simplest steering algorithm, but some other location of the camera on the vehicle might be required for functional reasons and could be accommodated by adding a correction to the algorithm.

The video camera focuses an image on a CCD chip, which converts this optical image into an EIA standard RS-170 composite video signal which is fed to a video tracker 42.

The tracker 42 is a real time digital image processor that automatically tracks the apparent movement of an overhead light or other selected feature in the camera field of view as the machine moves along its course. On its front panel are a number of manual controls. Joystick 26 positions a tracking gate 28 around a selected overhead light 30 as viewed in a CRT monitor 20. Thumb wheels 31 are used to set the size of the gate. A row of toggle switches 39 select the mode of control, e.g. manual or computer.

One suitable video tracker which is commercially available is the RK-446 system made by Iscan Inc. of Cambridge, Mass. It can track a single moving target and will output in pixels the (x,y) coordinates of the image of a point at the median center of an overhead light or target in view, updated every 16 msec.

The capability of this tracker to output the coordinates of a single point at the median center of each observed target greatly simplifies this guidance system. The computer only has to store and process a limited number of data points, which requires only a modest memory and computing capability.

Currently there are efforts being made to design mobile robots which "see" their surroundings with video cameras and match the pattern of features in the scene with a pattern of features previously stored in the robot's memory. The general experience with these machines has been that the enormous amount of data supplied by the video camera has severely taxed the available computers, with the result that response times have been very slow. Current research in this area is focused on ways to eliminate much of the visual data without reducing the robot's guidance capability. The system used in the present invention surmounts this problem by using only a few prominent features in the overhead environment and reducing each of them to a single point at specific coordinates. The required computer capacity is thus far less, and response time much faster, than with current mobile robots using video pattern matching as a primary guidance control.

Figure 16:
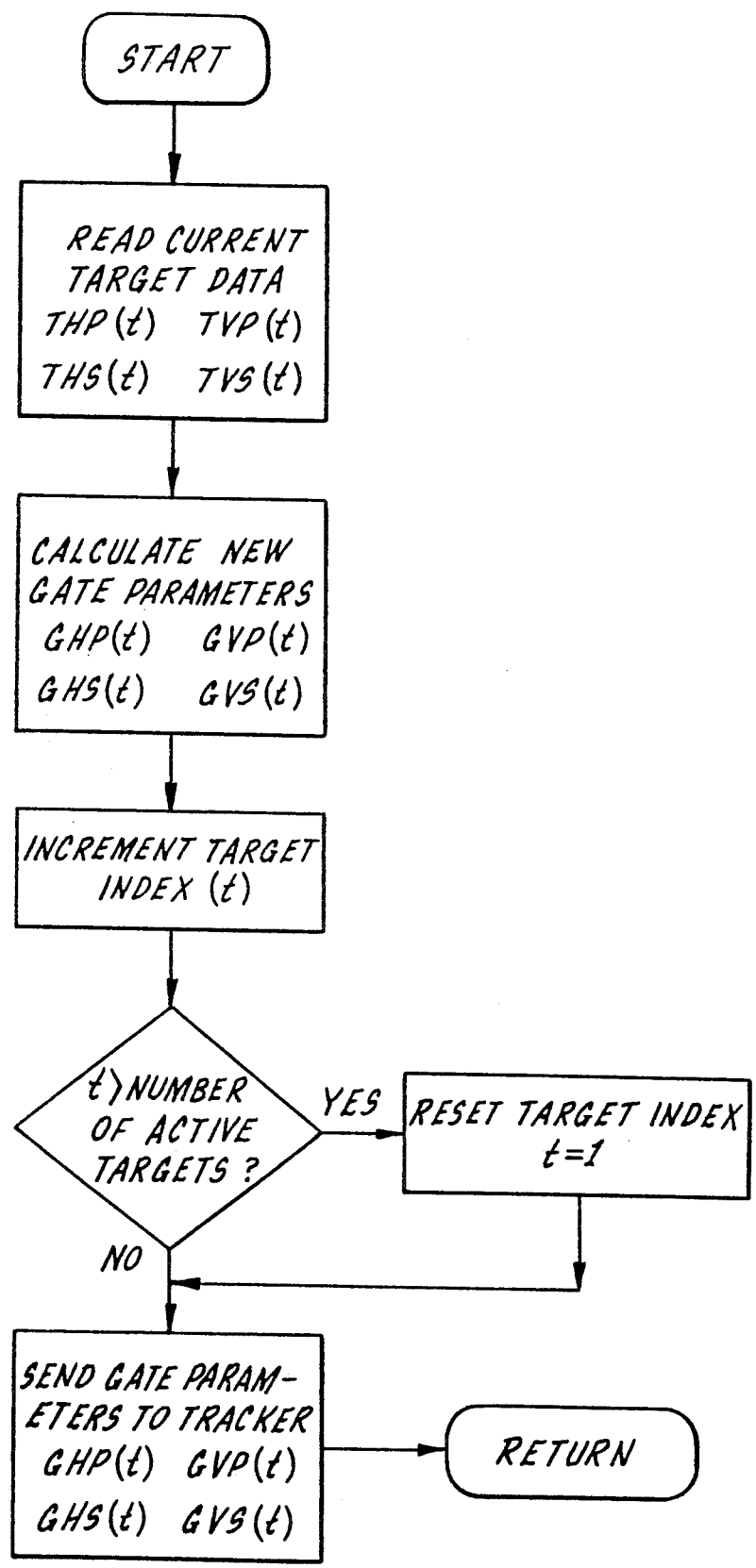
FIG. 16 is a flow chart for software to cause a single target video tracker to alternately and repeatedly track two selected targets.

Use of the present tracker with two lights makes it necessary to provide multiple target software in the computer which will rapidly and repeatedly switch the tracker back and forth between two selected targets so that data can be acquired on both. A flow chart of this software is shown in FIG. 16. A multiple target tracker may be used which will eliminate the necessity for this software and speed up the operation of the system.

An alternative system provides guidance by viewing only one light at a time, so can use a single target tracker without multiple target software. The preferred embodiment requires a minimum of two lights, but a one-light system will be described later as an alternative embodiment.

The CRT monitor 20 is mounted on the chassis and is positioned so that its screen can be conveniently seen by a person standing or walking behind the machine. It displays the images of the overhead lights as seen by the camera and tracker. It is primarily useful in the teaching mode, and will be discussed under that subject.

The Motor Control Subsystem

This subsystem is shown diagrammatically as 38 in FIG. 2. A commercially available motor controller 57 may be used, for example the model DMC-200 programmable two-axis DC motor controller made by Galil Motion Control, Inc. of Mountain View, Calif. Other acceptable controllers are also available. A non-programmable model may be chosen and the necessary programming incorporated into the vehicle computer if that is preferred. The controller must selectively control velocity or position of two motors 58, utilizing appropriate feedback such as from optical encoders 44 coupled to either the motors or the wheels.

Velocity mode control is used when the vision system is guiding the vehicle. In this mode, steering is accomplished by the two motors turning at different speeds due to the inputs of VL and VR (left and right wheel velocities) from the computer. The wheel encoders 44 provide local feedback for the motor controller to maintain the velocity profile programmed during the teaching mode.

Position mode control ma be used if desired during sharp turns and other predefined motions. In this mode, steering is accomplished by rotating the wheels through angular displacements based on encoder counts recorded in the reference data base during the teaching mode, and without any reference to the overhead lights. The encoder ratio (Re) is the ratio of right encoder pulses (Pr) divided by left encoder pulses (Pl), or Re=Pr/Pl. The program can be set up to put the motor controller into position mode control if this ratio exceeds an arbitrary assigned range, such as, for example, Re<0.5 or Re>2.0. The two limits are reciprocals of each other and allow for right and left turns. A further explanation is provided in the flow charts of FIGS. 14A and 14B.

Referring to FIG. 2, outputs from the controller are fed through amplifiers 56 to right and left drive motors 58. These are connected to the drive wheels 10 through 15:1 reduction gear boxes 60. Optical encoders 44 are coupled to the motors to provide position feedback of the wheels from which the distance actually travelled may be determined when needed, and to provide a ratio of right and left wheel rotations as described above.

The Reference Data Base

During the teaching mode, when the machine is being manually operated, information is received from the tracker 42 concerning the image coordinates of the center points of certain overhead lights or targets in the camera field of view. The operator will select a suitable pair of lights which show on the monitor screen and place a tracking gate around each of them. This will cause the tracker to operate on these two particular targets. As the vehicle progresses along the intended course these lights will move through the field of view and a new set of lights must be selected. Each time that; one image pattern is acquired, carried across the screen and then terminated a discrete data record is written into the reference data base 41 in the computer RAM, and each of these records is referred to, as a frame. Each frame puts a record into the data base of the initial size and (x,y) coordinates of the tracking gates, the initial and final (x,y) coordinates of the center points of the targets, the count accumulated during the frame by the left and right wheel encoders and a target brightness threshold for each target. The height H of each overhead light above the camera (FIG. 10) may also be recorded. The method of determining this will be explained later. The series of these frames acquired along the desired course during the teaching mode comprises the reference data base. It is stored in the computer RAM and is saved in the non-volatile memory for future use.

Lens Correction

Figure 15:
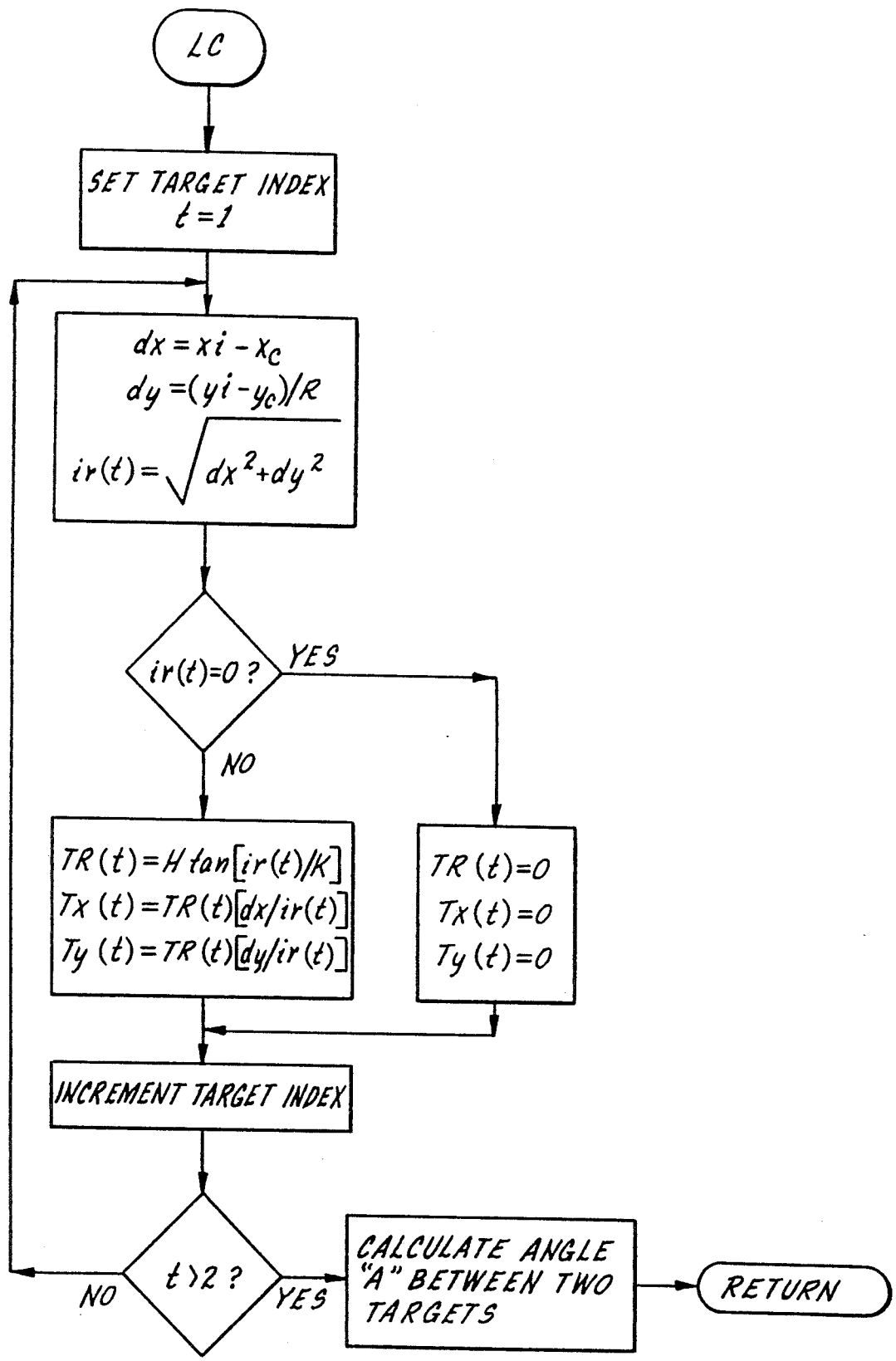
FIG. 15 is a flow chart of the lens correction subroutine, which calculates the coordinates and angular orientation of observed targets.

The target image coordinates supplied from the video tracker require correction for two inherent errors before they can provide accurate input for guiding the vehicle. The lens correction portion of the computer is indicated at 43 and its software is shown in FIG. 15.

Pixel Correction

In the camera used herein, the pixels in the CCD chip are shorter in the (y) direction than they are in the (x) direction. This causes the target (y) coordinates to be greater than they should be. It is necessary to divide the (y) coordinates by a factor R which is the ratio of pixel length to height. This brings the (x) and (y) coordinates to the same scale. Cameras having square pixels would not need this correction.

Lens Distortion Correction

A camera lens produces an image of the objects in a field of view. Because of the lens characteristics, however, that image will be somewhat distorted, and objects in the image will not have quite the same locations relative to each other that the real objects have to each other in space. The shorter the focal length of the lens the more pronounced this distortion will be. The wide angle lens used in this system has considerable distortion, and consequently the image coordinates of the overhead lights as reported by the tracker are not proportional to the true real world coordinates of those lights. Referring to FIG. 6, the image range (ir) is shown as the distance of the target image from the camera centerline at the camera focal plane 50. The lens distortion will cause the image range (ir) to vary as a function of the angle B, and depending on the lens used, the function may be linear, parabolic or trigonometric. The distortion is determined experimentally by careful laboratory measurements from which the function is determined.

In the lens used herein the distortion is linear, so ir=KB, where K is a constant derived from the measured distortion. This is the correction factor for a specific lens distortion, and is applied by the lens correction software described in FIG. 15.

Variation in Height of Overhead Lights

Referring again to FIG. 6, TR is the target range, or the horizontal distance of the center of the overhead light 48 from the camera and vehicle vertical centerline VC at the point 46 level with the light and directly above the camera. There is a corresponding image range (ir) at the focal plane 50 of the camera. A given image range (ir) can represent a given target range (TR) only when the target is at a known height H above the camera. Since overhead features such as lights may vary in height, provision should be made to measure the height from the camera up to each overhead light and supply this information to the computer in each frame. This is done by a triangulation procedure during the teaching mode.

Figure 10:
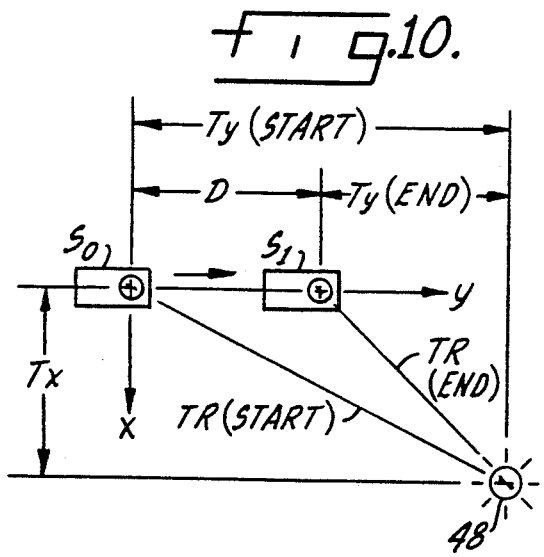
FIGS. 10 and 10A are a plan view and an elevation view respectively which together illustrate how the heights of overhead lights are determined.
Figure 10A:
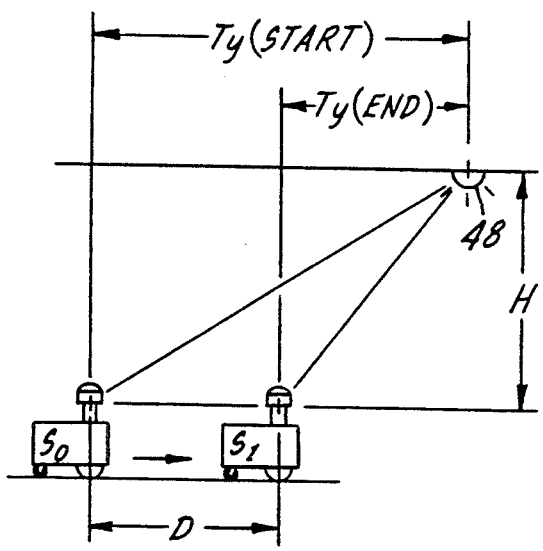

This calculation for H is diagrammed in FIGS. 10 and 10A, which are respectively a plan view and an elevation view of a vehicle moving relative to a light 48. During a particular teaching mode frame the machine moves along a (Y) axis from a starting position $S_0$ to an ending position $S_1$, which is a distance D. As shown in FIG. 10, the light 48 is at some horizontal location relative to the machine with coordinates Tx,Ty(start) when the machine is at position $S_0$ and Tx,Ty(end) when the machine is at position $S_1$. The Y-axis coordinates Ty(start) and Ty(end) are the horizontal components along the machine path of the distance from the light 48 to the machine at machine positions $S_0$ and $S_1$. They are obtained by observing the light 48 when the machine is at position $S_0$ and again when it is at position $S_1$ and then performing the calculations for (Ty) that are described in the section "Determination of Target Coordinates".

The calculation for target height H first involves assuming a hypothetical height H'=1 and calculating corresponding values for Ty'(start) and Ty'(end). These are hypothetical values, but are correct for the assumed condition. Next calculate a hypothetical value for D' under the assumed condition, using the formula: D'=Ty'(end)−Ty'(start).

The true value of D, or distance actually travelled during the teaching mode frame, is supplied to the computer by the wheel encoders shown at 44 in FIG. 2. It can be an average of the counts by the left and right wheel encoders which are accumulated and recorded for each frame in the reference data base. A ratio D/D' compares the actual distance traveled to the hypothetical distance traveled. By similar triangles, the actual height H is to the hypothetical height H' as the actual distance D is to the hypothetical distance D'.

H/H'=D/D' or H=H'D/D' or since H'=1, H=D/D' A value of H may be calculated for each light in each frame in the teaching mode and recorded in the reference database. The lights may be but do not have to be at equal heights. During the repeat mode these values of H may be used in calculating the coordinates of the centers of the selected overhead lights.

Path Error Measurements Ea, Ex and Ey

Refer to FIG. 3, which is a sketch of the vehicle relative to its desired path. In the repeat mode a comparison between the real time information and the reference database information results in three values which describe the vehicle's position and angular orientation at any given time. The term Ex measures the x-axis (lateral or left-right) position error and Ea is the angular or orientation error. If both of these are zero the vehicle is located on the desired path and headed along that path. Non-zero values indicate a need to correct position or heading or both. The term Ey is a measure of the vehicle's location along the desired path relative to a reference set of targets. When the magnitude of Ey approaches zero it is time to advance to the next reference frame. These error measurements are made by comparing the coordinates of the center points of an observed pattern of lights with the coordinates of the center points of a reference pattern of lights which were recorded during the teaching mode and are presumed to be correct. Several calculations are required to do this, which will now be described.

Determination of Target Center Point Coordinates

Figure 14B:
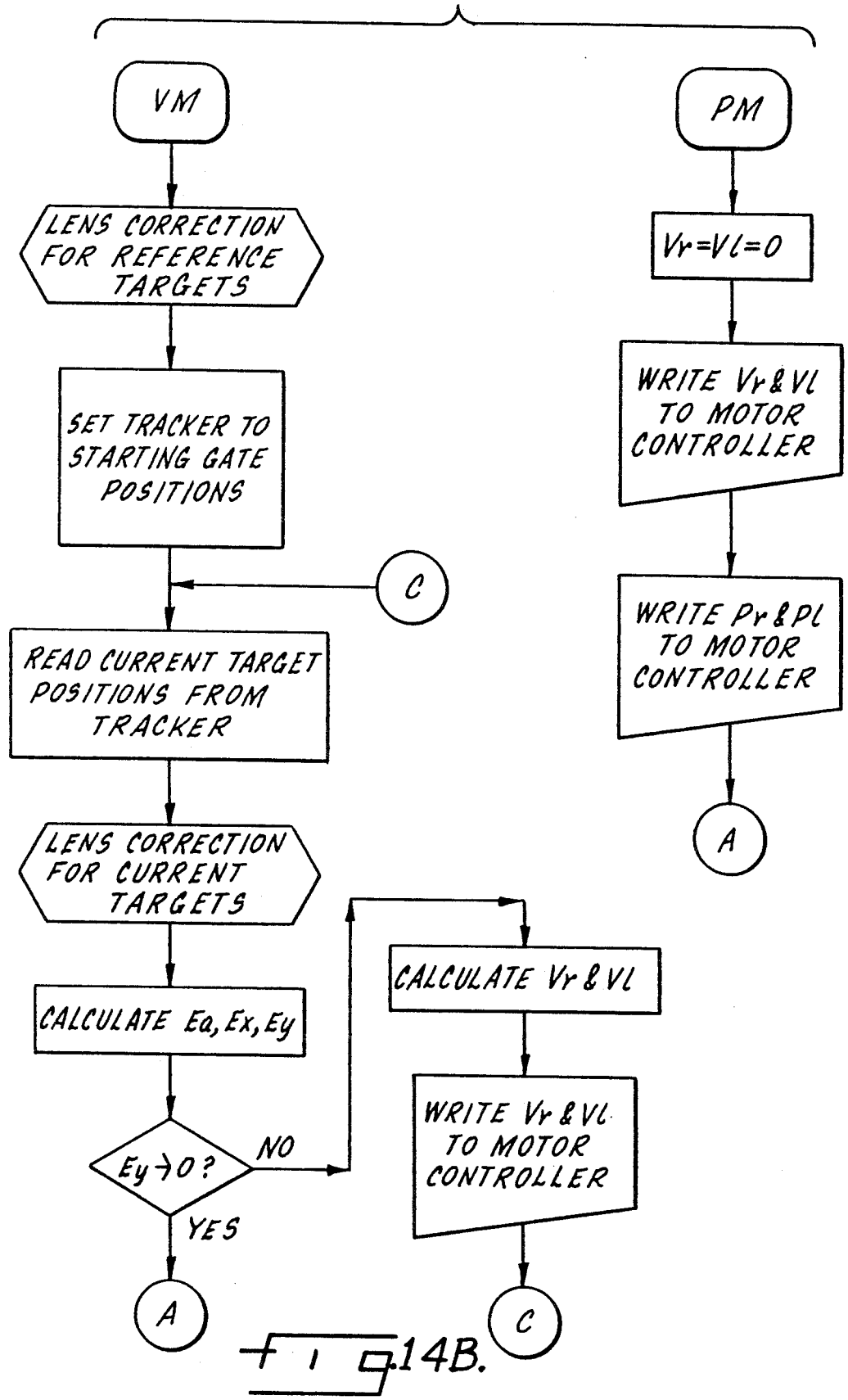

During vision mode operation in a repeat path subroutine, FIGS. 14A and 14B, input data to the computer is received once per frame from the reference data base and every 16 msec. from the tracker. This data gives the image coordinates (xi,yi) of the median center points of the observed targets and the reference targets relative to the upper left corner of the field of view. This is illustrated for one typical target 48 in FIG. 4.

In order to obtain the real world position of the vehicle this data must be converted into real world coordinates (Tx,Ty) of the observed target centers and (Rx,Ry) of the reference target centers. These coordinates must be relative to the vehicle centerline 46. This coordinate field for a typical observed target 48 is shown in FIG. 5.

The first step in this conversion is to transfer the image coordinates from an origin at the upper left corner of the field of view to an origin at the camera centerline. See FIG. 4. Enter with xi,yi. Leave with dx,dy.

$$dx = (xi - xc)$$

$$dy = (yi - yc)/R$$

Where R is the ratio of pixel length to height, as discussed earlier. The image range (ir) is:

$$ir = \sqrt{(dx^2 + dy^2)}$$

Next the image coordinates (dx,dy,ir) of FIG. 4 on focal plane 50 of FIG. 6 are converted into the target coordinates (Tx,Ty,TR) of FIG. 5 at the known height H, shown in FIG. 6.

Referring to FIG. 6, the target range (TR) is:

$$TR = H \tan B$$

It is known that due to the lens distortion $ir = KB$, or $B = ir/K$. Substituting into the previous equation gives:

$$TR = H \tan(ir/K)$$

Referring to FIGS. 4 and 5, by similar triangles:

$$Tx/dx = Ty/dy = TR/ir$$

$$Tx = dx\, TR/ir$$

$$Ty = dy\, TR/ir$$

These calculations are made for both targets $(T_1, T_2)$ currently being observed. Similar calculations are made to convert reference image coordinates $(xi, yi)$ into reference target coordinates $(Rx, Ry)$ for both reference targets $(R_1, R_2)$.

Determination of Path Errors Ea, Ex and Ey

At this point it is possible to compare the observed target coordinates $(Tx, Ty)$ with the reference target coordinates $(Rx, Ry)$ and determine the angular error Ea, the lateral position error Ex and the longitudinal position error Ey as diagrammed in FIG. 3.

Figure 7:
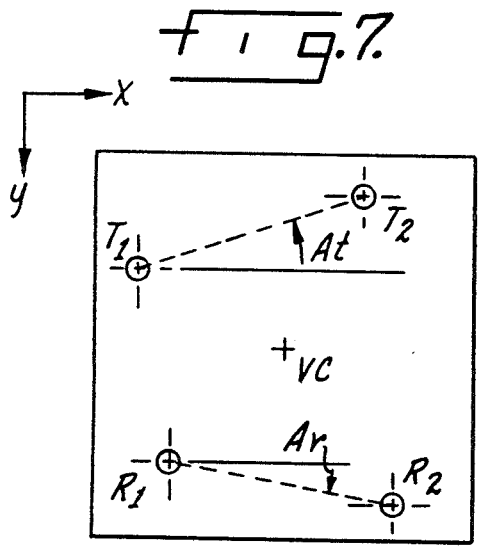
FIG. 7 is a sketch comparing the angular relationship of the center points of two real time overhead lights with two reference overhead lights when the vehicle is not on its proper heading.
Figure 8:
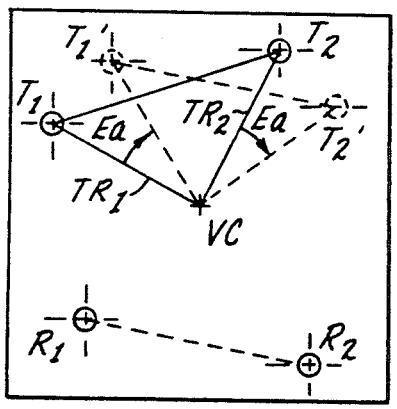
FIG. 8 illustrates the solution used to decouple angular heading errors so that lateral and longitudinal position errors may be determined.
Figure 9:
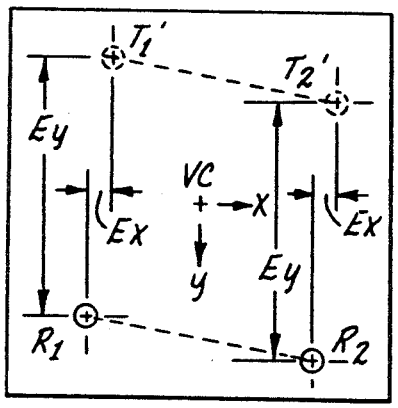
FIG. 9 illustrates lateral and longitudinal position errors.

FIGS. 7, 8 and 9 illustrate the method for obtaining these values. The nomenclature is:

- $T_1, T_2$ = real time targets (observed during repeat mode)
- $R_1, R_2$ = reference targets (recorded during the teaching mode)
- VC = vehicle center (the central point between its drive wheels.) In the described embodiment VC is also the optical centerline of the camera
- At = angle of real time targets
- Ar = angle of reference targets
- Ea = angular error, or error in heading or orientation
- $T_1', T_2' = T_1, T_2$ after rotation about point VC through angle Ea
- Ex = lateral or left-right error in position
- Ey = difference along desired track between $T_1'$ and $R_1$, or $T_2'$ and $R_2$
- $TA_1, TA_2$ = angular locations of $T_1, T_2$ in polar coordinates
- $TR_1, TR_2$ = Range or distance location of $T_1, T_2$ in polar coordinates.

The calculations are made as follows:

Step #1: Calculation of angular error Ea

Referring to FIG. 7, coordinates Rx and Ry are obtained once per frame for the reference targets $R_1$ and $R_2$. With this information the angle Ar is calculated. Coordinates Tx and Ty are repeatedly obtained for the real time targets $T_1$ and $T_2$. With this information the angle At is calculated. If At = Ar then the machine is heading parallel to the reference path and Ea = 0. Skip to step #3. If (At) is not equal to (Ar) then the machine is not headed parallel to the reference path and EA = Ar − At. The determination of Ex and Ey requires that Ea = 0, so that the computer is supplied a pattern of observed target centers which is based on the same heading as the vehicle was following when the comparison reference pattern was recorded. Step #2 must be completed before going to step #3.

Step #2: Adjusting Observed Target Locations For Angular Error

In order to decouple Ex and Ey from the angular error Ea, the target locations must be rotated about the vehicle centerline VC. As illustrated in FIG. 8, the points T1 and T2 are rotated around point VC through an angle equal to Ea, which will give imaginary targets $T_1'$ and $T_2'$. This requires converting the Cartesian coordinates to polar coordinates:

$$TR_1 = \sqrt{(Tx_1^2 + Ty_1^2)}$$

$$TA_1 = \tan^{-1}(Ty_1/Tx_1)$$

Repeat for $TR_2$ and $TA_2$.

Since Ea is the vehicle's angular error, the TA values are adjusted by this amount to bring the observed targets in line with the reference targets.

$$TA_1' = TA_1 - Ea$$

$$TA_2' = TA_2 - Ea$$

The line connecting the imaginary points $T_1'$ and $T_2'$ will be parallel to the line connecting $R_1$ and $R_2$ in FIG. 9.

Next the polar coordinates of the imaginary targets $T_1'$ and $T_2'$ must be converted back into Cartesian coordinates.

$$Tx_1' = TR_1' \cos TA_1'$$

$$Ty_1' = TR_1' \sin TA_1'$$

Repeat for $Tx_2'$ and $Ty_2'$. These imaginary target coordinates are now in condition to be compared with the reference target coordinates even though the vehicle is not heading in the same direction (has an angular error Ea) as it was heading when the reference target locations were recorded.

Step #3: Calculation Of Lateral Error Ex and Position Along Track Ey.

Referring to FIG. 9, Ex and Ey are the differences between the x and y values of either R1 and T1' or R2 and T2'. In theory, Ex and Ey as obtained from T1' or T2' will be equal. In practice there will be slight differences due to electronic noise and vehicle motion. These slight differences are averaged.

$$Ex = [(Tx_1' - Rx_1) + (Tx_2' - Rx_2)]/2$$

The position along track Ey is obtained in a similar manner. Ey is used to determine when new reference data should be used. As the vehicle moves, Ey approaches zero. When Ey is sufficiently close to zero, based on vehicle speed and acceleration, new reference target data is obtained from the reference data base.

At this point it is relevant to point out that this invention, by viewing the scene above the vehicle, is distinctly different from other mobile robots currently being developed which use forward-looking video cameras for guidance. These latter machines view the scene in front of them and record it as a flat image in a transverse vertical plane, like the flat screen in the front of a movie theater. Comparing such an image taken from memory with a currently observed image can only show a lateral deviation, or Ex.

On the other hand, the present invention views the overhead environment and records points taken from it on a flat horizontal plane, like a movie projected on a ceiling. That plane is parallel to the surface on which the vehicle is operating and therefore all the possible course errors of the vehicle, namely Ex, Ey, and Ea can be evaluated in this one view. The machine has no need for a direction sensor such as a compass or a gyro, which some mobile robots do, to control its angular orientation, or Ea. Also, distance along course can be continuously monitored by visual means, without primary reliance on wheel count or other mechanical means of measuring distance travelled. Neither is there any need for range finding by laser, ultrasonics, or other means to find the vehicle's position along the course.

Motor Speed Calculation

Ea and Ex are outputs from the path error measurement circuit 70 shown in FIG. 2, to the motor speed calculation circuit 72, also shown in FIG. 2, where they are used to change the speed of the drive wheels, speeding one up and slowing the other one down equally by an amount dV to cause the vehicle to return to its desired path. A proportional control formula is used as follows:

$$dV = K_1 Ex + K_2 Ea$$

$K_1$ and $K_2$ are constants determined experimentally, or mathematically calculated from significant parameters of vehicle dynamics and kinematics. In the present case it was more practical to determine them experimentally.

Left wheel speed: $VL = Vm + dV$

Right wheel speed: $VR = Vm - dV$

Where Vm = mean vehicle velocity. Ex, Ea and dV have both magnitude and sign. The direction that the vehicle turns will be determined by the sign of dV. A greater magnitude of dV will give a turn of shorter radius (a sharper turn). The purpose of this control formula is to bring the vehicle back onto course in the shortest possible time without overshoot.

Flow Charts

Automatic operation of the guidance system disclosed herein requires suitable programming for computer 34. FIGS. 11 through 16 show simplified flow charts for the program. The flow charts take the mathematical equations which have been discussed and incorporate them into a format which is suitable for computer control. The flow charts in combination with the above mathematical presentation will enable one skilled in the art to practice the invention.

OPERATION: THE TEACHING MODE

In operation the vehicle is first moved under manual control to a selected starting position. The operator will look at the video monitor and observe what overhead lights are in the field of view. He or she will select two lights that are somewhat ahead of the machine and therefore showing near the top of the monitor screen, and by use of the manual controls on the target tracker superimpose a rectangular tracking gate around each one. This directs the tracker as to which targets it is to track. The operator then manually causes the machine to move forward along the desired path at a selected speed. The selected targets and their gates will move downward on the monitor screen as the machine passes underneath the overhead lights. If the machine is being moved straight forward the images will move straight down on the screen and drop out of the field of view at the bottom of the screen. If a curved course is being followed, the images will move in a curve and one or the other target image may move out of the field of view at one side of the monitor screen. Wherever they move, when a target is nearly out of the field of view, that frame will be terminated and its data recorded as described in the section on the reference data base. A new pair of targets will be selected, again near the top of the screen, and the process will be repeated.

In a very sharp turn the target images may appear to revolve around some point on the screen. This situation can be handled by breaking up the turn into segments and treating each segment as a separate frame.

An optional method is to handle the entire turn in one frame by using the wheel encoder counts for both wheels for the complete turn. The software can be programmed so that if the ratio of the wheel encoder counts for a given frame is greater than some arbitrary value, for example 2:1, indicating a sharp turn, during repeat mode operation the motor controller will switch from velocity mode to position mode control and rotate each wheel the recorded number of encoder counts. This will duplicate the entire teaching mode turn in one frame without referring to visual data. This reduces the number of frames and hence the amount of RAM required for the reference data base.

After the turn is completed the operator will again select overhead lights that are showing on the monitor and continue recording frames under vision control. Some combination of vision frames and position mode frames will continue until the desired track has been completed and the reference data for that track is recorded in non-volatile memory. A number of tracks can be thus recorded if desired.

OPERATION: THE REPEAT MODE

After the desired path or paths have been driven in the teaching mode the vehicle is ready to operate in the unmanned repeat mode. It will be manually driven to the approximate starting position of the desired path. It does not have to be in the precise starting position; the guidance system will observe a small error and correct the vehicle to the correct track as soon as it begins to move. The reference data for that path must be loaded into the computer RAM from the non-volatile memory. Then automatic operation can be started. Each frame of reference data will tell the tracker where to look for targets. When found, they will be compared to the reference positions and steering corrections made if necessary to bring Ex and Ea to zero, thereby keeping the vehicle on the intended course. As the machine moves along the course the value of Ey will diminish. When it approaches close to zero the next reference frame will be called up and the cycle will be repeated. This procedure will control the vehicle for straight line travel and gradual turns. It can also be used for sharp turns if they were broken into segments during the teaching mode. However, if the optional method of controlling sharp turns by motor position rather than by visual means was elected, in each frame the ratio of the reference values of the wheel encoder counts will be looked at. If the ratio exceeds an arbitrary value such as 2:1 the computer will handle it as a position mode turn. The motor controller will be put in its position mode. The turn will then be made by rotating each drive wheel an amount equal to the encoder counts recorded for that frame in the reference data base. If the next frame shows a wheel encoder count ratio of less than 2:1 the computer will revert to vision control and place the motor controller back in velocity mode. Steering will again be controlled by reference to the overhead lights. In this way the vehicle will proceed until it reaches the end of the recorded reference data, at which time it can stop and wait for further instructions, or if the route is designed as a continuous circuit the machine can repeat the route in a continuous loop, if that is desired.

ALTERNATIVE EMBODIMENTS

Anyone who is skilled in the art of controls will realize that the embodiment of the invention which has been described can be altered at a number of points and still achieve the desired ends.

The use of a video camera is important; however, it is not absolutely essential that it be pointed straight up. It could be pointed at an angle, such as up and forward. The algorithms are simpler if it is pointed straight up, but the forward angle could be accommodated by using an additional trigonometric function.

The type of video camera is not critical. A CCD camera provides a rugged, solid state unit that is suitable for use in an industrial environment, but a vidicon or other type of camera could also be used.

The preferred location for the camera is directly over the drive wheels and centered between them. Again, this makes for the simplest algorithms because it makes the camera optical centerline and the vehicle center of turn identical. However, other camera locations on the vehicle may be required for functional reasons and can be accommodated by appropriate correction factors.

The vehicle that has been described is steered by differential speed control of its two drive wheels, while the rest of the vehicle weight is supported by free swiveling casters. Again, this was done because it made for the simplest steering algorithms. Many vehicles, however, are steered by turning one or more steerable wheels which may or may not be driving wheels. A conventional automobile is a familiar example. The unmanned guidance system of this invention can be applied to such vehicles by causing the computer to control a conventional power steering system rather than the motor control subsystem of the described embodiment. Encoders can be adapted to the wheels of such vehicles to provide the needed angular velocity or position feedback data.

An image processing system is necessary to track the targets being observed and assign coordinate values to their positions. A commercially available video tracker was picked as the most suitable unit. However, the image processing function could be handled in other ways. For example, it could be performed by a video camera, a frame grabber and a digitizer with image processing being done by the computer if that unit had adequate capacity to handle it. The method for finding the position of more than one target can also be done in different ways. For example, multiple targets can be multiplexed through a single target tracker. Alternatively, a multi-target tracker can be used, which eliminates the need for the multiplexing software.

The discussion and formulas have assumed two overhead lights or targets for each frame. In the preferred method two is the smallest number of targets that can be used. However, the algorithms may be adjusted to handle a specified number of targets greater than two. This would produce greater accuracy and a more robust system, since the loss of a target from time to time would still leave at least the minimum number needed for guidance.

Figure 17:
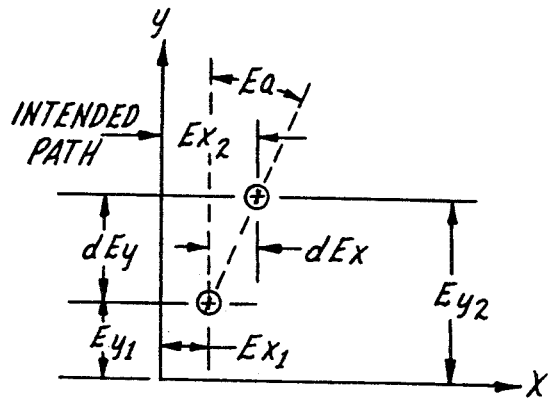
FIG. 17 is a diagram illustrating the calculation to obtain angular heading error from two successive values of lateral path error.
Figure 11:
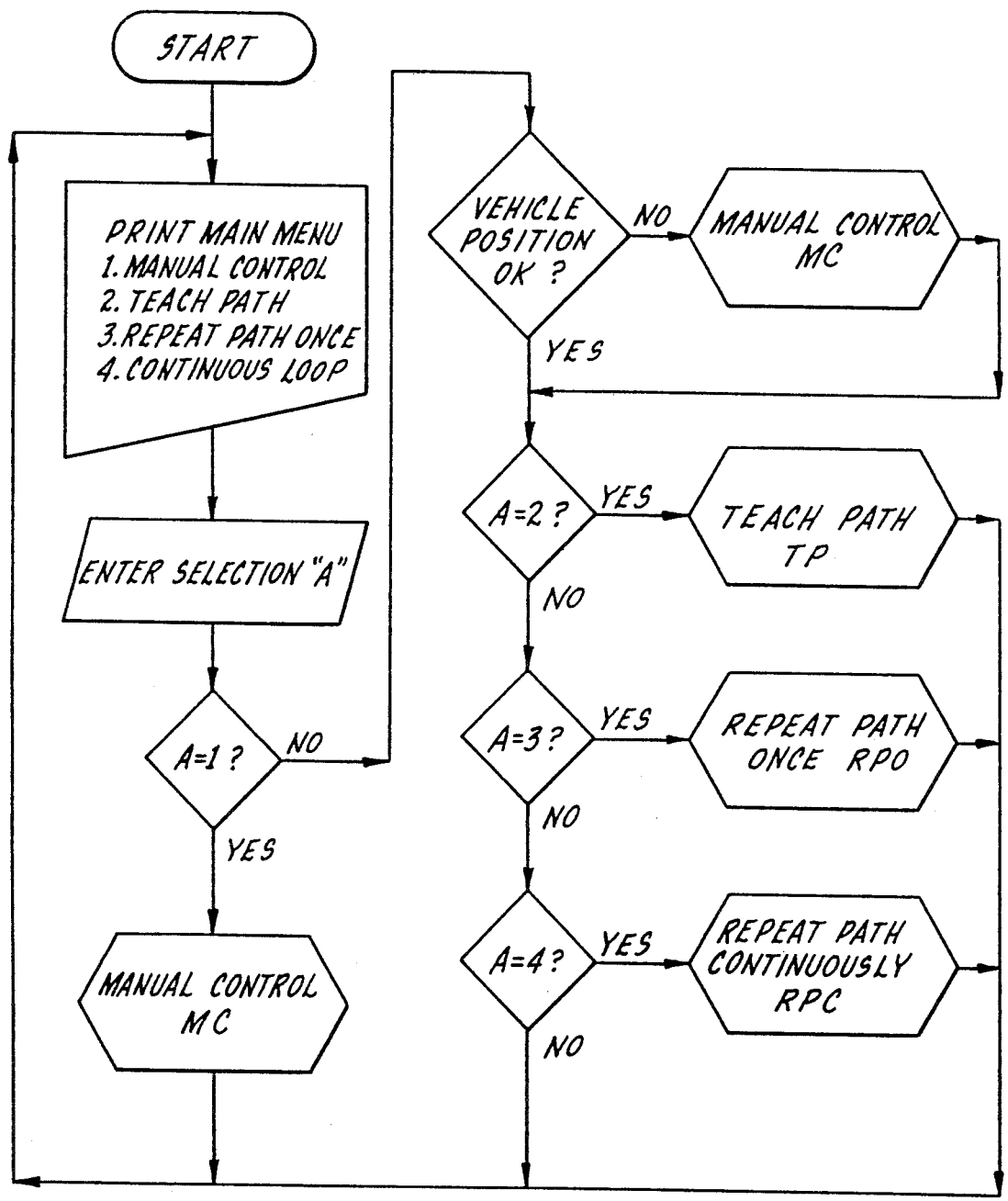
FIG. 11 is a flow chart showing the main menu of operational modes.
Figure 12:
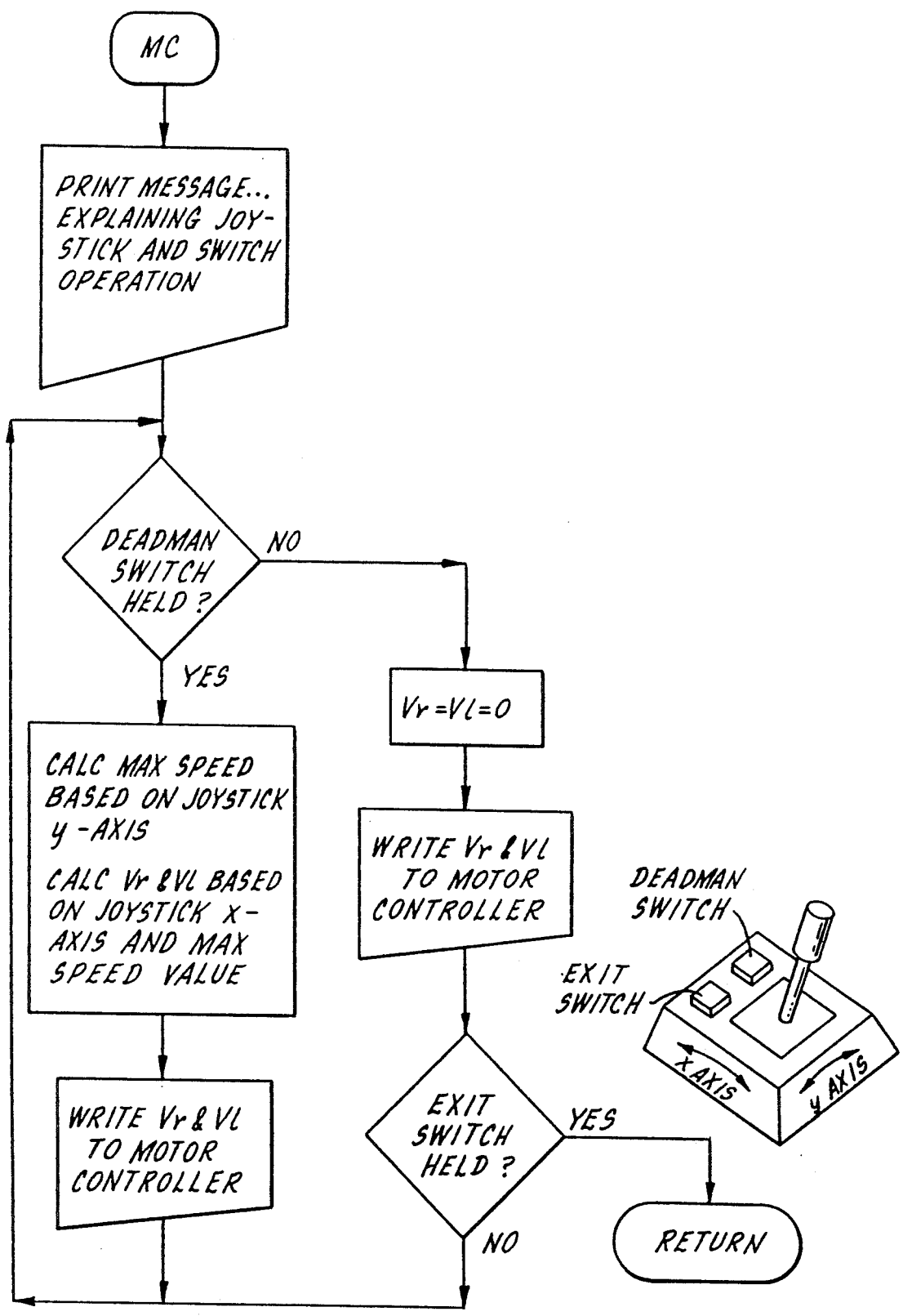
FIG. 12 is a flow chart of the manual control subroutine.
Figure 13:
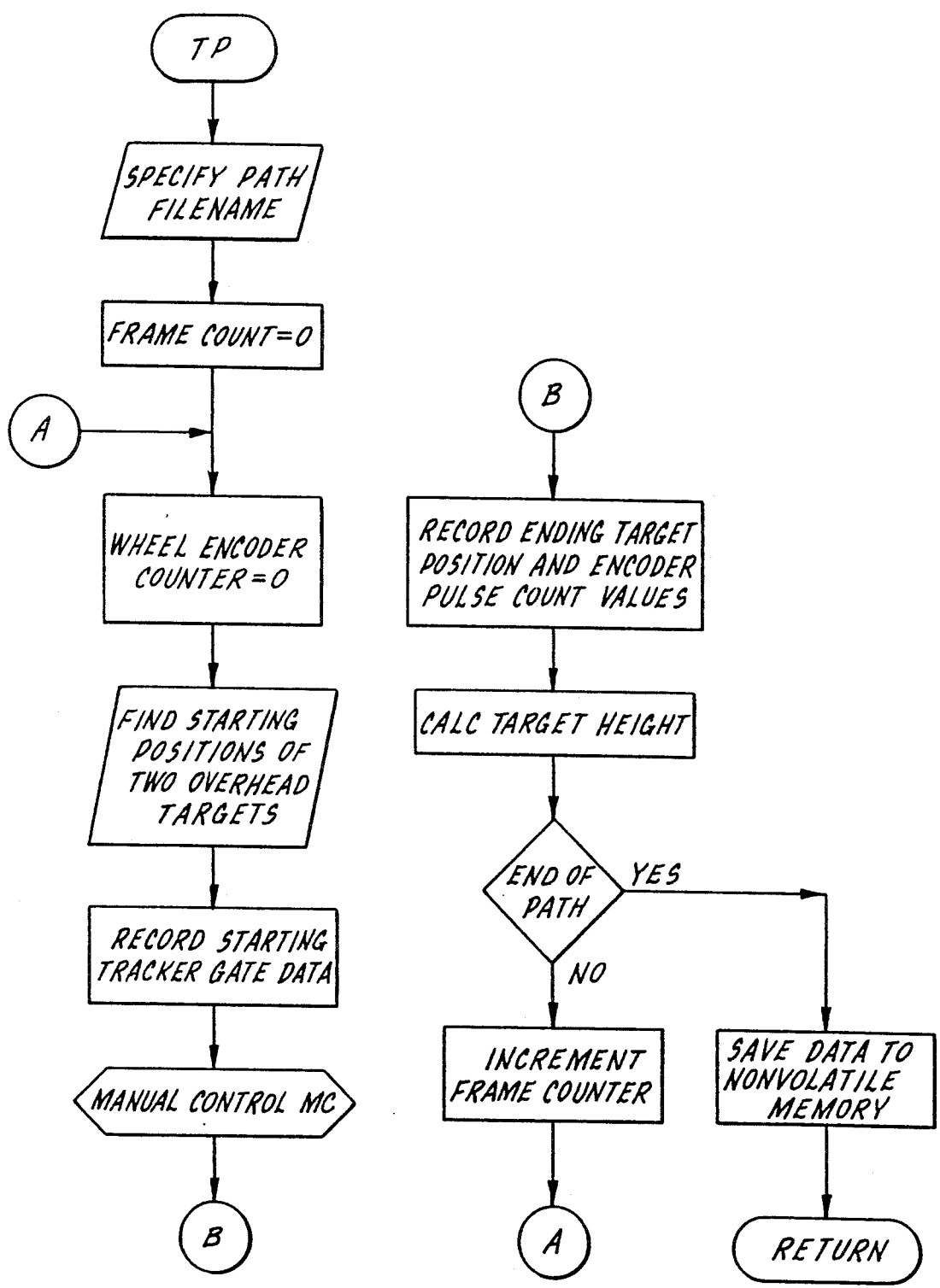
FIG. 13 is a flow chart of the teach path subroutine.

It is possible that only one overhead light might be available at a time. Path error measurements (Ex) and (Ey) can be determined by observing only one overhead light, though with a little less precision than if obtained by averaging the readings on two lights. The determination of angular error (Ea) however, as described in the preferred embodiment, requires observations of two or more lights. There is an alternative method of finding (Ea) that can be used if only one overhead light is available at a time. See FIG. 17. In this sketch the (Y) axis is the desired path of the vehicle. At position ($Ey_1$) along the path an observation of an overhead light shows a lateral error of ($Ex_1$), and at a further distance (dEy) along the path another observation of the same overhead light shows a lateral error of ($Ex_2$). The true heading of the vehicle is the line connecting the points ($Ex_1,Ey_1$) and (dEx,dEy). The angular error (Ea) can be expressed as:

$$Ea = \tan^{-1}(dEx/dEy)$$

This method makes guidance possible with a succession of single targets, but it does require travelling a distance along the path before a value of (Ea) can be computed. That limits the frequency with which steering corrections can be made. The preferred method which was described earlier allows instantaneous determinations of (Ea) so that steering corrections can be made very frequently if needed. Thus guiding by two lights gives greater precision in following a preselected course than can be obtained with the single target method.

The preferred embodiment has been described as sighting on pre-existing overhead lights in some indoor environment such as a factory or warehouse. This is a convenient way to operate and avoids the expense of installing targets for the video camera to sight on. However, if overhead lights were not available, or if for some reason it was desired not to use them, other targets could be used. All that is required is that the target shall have enough visual contrast with its background to be readily distinguishable by the vision system in the available light. For example, it has been found that the intersection of two ceiling beams can serve as a target. Twelve-inch plywood circles painted white and mounted against a black ceiling, or black circles against a white ceiling, could serve the purpose. In an outdoor area such targets could be mounted on poles or by any other means. Indeed, such a vehicle could operate in a dark area if a light such as a strobe light or a flood light were mounted on the vehicle to illuminate the area above the vehicle where the targets are located. But overhead lights are so commonly found in commercial and industrial buildings that they are the natural choice in most cases.

It is necessary to know the height of the lights or other overhead targets in order to calculate the target coordinates. The section on "Variation in Height of Overhead Lights" outlines a procedure by which the vehicle may obtain the height of each light in each frame during the teaching mode and record it in nonvolatile memory. This gives high accuracy even though the lights may be at various heights, but it takes up some of the memory available in the computer. Many buildings where the vehicle might be used have overhead lights all set at one height. In such cases a single measurement of target height H may be made by any convenient means prior to operating the vehicle and this single value of H entered into the computer. This method conserves computer memory and gives adequate accuracy in buildings where the floor is level and all the lights are at one height.

In the preferred embodiment the vehicle is a self-sufficient unit which carries on board all the elements necessary to make the guidance system work. However, some of the elements could be off board, and communication between the mobile elements and the remote elements maintained by telemetry. For example, the computer could be a central unit doing processing for multiple vehicles and for other purposes, and could communicate with the vehicle by telemetry.

A means for manually operating the vehicle has been shown such that the operator would walk behind the vehicle. It is recognized that a vehicle could be constructed that would be suitable for an operator to ride on, and the manual controls could be disposed to be convenient for an operator riding on the vehicle.

And again it must be emphasized that a vehicle using this guidance system can have any functional purpose that is desired. It can be a fork lift truck, a floor scrubber, a freight hauler, a personnel carrier, a mobile robot, or anything desired. The guidance system is completely independent from the vehicle's functional purpose. It can be installed on a vehicle intended for any purpose. The scope of the invention extends to any and all vehicles using this guidance system.

Although the invention has been described as using overhead lights, it is also practical to have one or more lights mounted on the vehicle which lights would illuminate overhead contrasting areas.

The embodiments of the invention in which an exclusive property or privilege is claimed are defined as follows:

1. A method of operating a vehicle in which the vehicle automatically follows a predetermined path, including the steps of:
    moving the vehicle, under operator command, over a desired path in an area unmodified for the specific use of guiding an unmanned vehicle while making a record analogous to the movement of the vehicle as such movement relates to fixed previously existing generally overhead contrasting visible areas as seen by recording means on the vehicle sensitive to such contrasting visible areas so as to record at the same time both the X and Y axis coordinates of geometric points derived from the contrasting visible areas analogous to the desired path, and
    thereafter moving the vehicle, without operator control, over the desired path, the vehicle being maintained on the desired path by comparison between the analogous record and the vehicle path of movement as such movement relates to X and Y axis coordinates of geometric points derived from the fixed previously existing generally overhead contrasting visible areas as seen by the recording means to provide simultaneously Ex, Ey and Ea where Ex is lateral error, Ey is position along the desired path relative to a reference set of contrasting visible areas, and Ea is angular orientation error, and making vehicle course corrections based upon the observed Ex and Ea to cause the vehicle to follow the desired path.

2. The method of claim 1 further characterized in that the recording means is a video camera.

3. The method of claim 2 further characterized in that said video camera is pointed generally in a vertical direction.

4. The method of claim 1 further characterized in that the previously existing generally overhead contrasting visible areas are defined by spaced areas of artificial illumination.

5. The method of claim 4 further characterized in that said spaced areas of artificial illumination are disposed on or about the ceiling of a building.

6. The method of claim 4 further characterized in that the recording means defines at least a segment of the desired path of movement by the essentially simultaneous positions of geometric points derived from at least two spaced areas of artificial illumination.

7. The method of claim 6 further characterized in that the recording means defines the desired path of movement by the positions of the geometric points derived from successive groups of two or more spaced areas of artificial illumination.

8. The method of claim 6 further characterized in that the positions of said spaced areas of artificial illumination are recorded on the basis of the X, Y coordinates in a horizontal plane of the geometric point derived from each spaced area relative to a geometric point of reference on the recording means.

9. The method of claim 1 further characterized in that the vehicle is substantially continuously maintained on the desired path during the unmanned moving step by a comparison between the analogous record obtained during the manned moving step and the vehicle path of movement during the unmanned moving step.

10. A vehicle used primarily for unmanned operation including operator controls for driving the vehicle along a path determined by an operator in an area unmodified for the specific use of guiding an unmanned vehicle, means for recording the operator-determined path as it relates to fixed randomly disposed generally overhead contrasting visible areas in the locality where the vehicle operates as the vehicle is being driven over the operator-determined path so as to record at the same time both the X and Y axis coordinates of geometric points derived from the overhead features analogous to the predetermined path,
    means for controlling movement of the vehicle, without operator control, including means for determining the actual position of the vehicle relative to geometric points derived from the fixed randomly disposed contrasting visible areas of unspecified location in the locality where the vehicle operates, means for comparing the actual position of the vehicle thus determined with the desired recorded position of the vehicle to determine lateral error, angular error and position along the desired path, and means for making vehicle course corrections when the actual path of the vehicle deviates from the recorded path.

11. The vehicle of claim 10 further characterized in that the means for recording the operator-determined path and for determining the actual position of the vehicle include a video camera mounted on the vehicle.

12. The vehicle of claim 11 further characterized in that said video camera is pointed generally upward so as to observe contrasting visible areas above the path of movement of the vehicle.

13. The vehicle of claim 12 further characterized in that the contrasting visible areas are provided by features of the work environment not specially positioned to define the vehicle path of movement.

14. The vehicle of claim 13 further characterized in that the contrasting visible areas are formed by ceiling lights.

15. The combination of claim 11 further comprising a light mounted on the vehicle to illuminate the surroundings generally above the vehicle so that the defined features in those surroundings may be observed by the video camera even though the vehicle may be operating in an otherwise darkened area.

16. The vehicle of claim 10 further characterized in that the means for recording include means enabling the operator to select successive sets of two or more fixed contrasting visible areas as the vehicle is moved by the operator along the predetermined path.

17. The vehicle of claim 16 further characterized in that geometric points derived from the same successive sets of two or more fixed contrasting visible areas are used to determine the actual position and angular orientation of the vehicle during operation without an operator and form the basis for vehicle course corrections.

18. The combination comprising a vehicle intended primarily for unmanned operation, having a frame supported on wheels, drive means for propelling the vehicle and steering means for steering it, means for operating said vehicle in a manual teaching mode in an area unmodified for the specific use of guiding an unmanned vehicle and along a desired course that an operator of the vehicle wants it to follow in a subsequent unmanned mode, a generally vertically directed video camera mounted on the vehicle, image processing means connected to the video camera, computer means including a memory connected to the image processing means, means for successively selecting sets of two or more defined features in the surroundings generally above the vehicle in the field of view of the video camera as the vehicle is operated along the desired course in the teaching mode, observing such features with the video camera, obtaining successive representations of the locations of geometric points derived from the features in the sets of two or more features from the observations so as to obtain simultaneously both the X and Y axis coordinates of geometric points derived from the said defined features analogous to the desired path, and electronically recording these successive representations in the computer memory, means for positioning the vehicle close to or at the start of the same desired course after the teaching mode is complete and starting the vehicle in unmanned operation with the video camera again observing the same sets of two or more features generally above the vehicle, means for obtaining successive representations of the locations of the same geometric points derived from the same features in the same sets of two or more features as were observed while operating in the teaching mode and comparing such representations with the location representations recorded while operating in the teaching mode to simultaneously provide lateral error on the X axis, position on the Y axis and angular orientation error, means for deriving course corrective signals from the comparisons and means to apply the course corrective signals for the X-axis error and angular orientation error to the steering means of the vehicle so as to maintain the unmanned vehicle on a course essentially the same as the course which was traveled during the teaching mode.

19. A guidance system for a primarily automated vehicle which operates on a generally horizontal surface wherein a video camera mounted on the vehicle is used to successively observe certain overhead contrasting randomly positioned features generally above the vehicle and wherein the camera images of those features are processed into digital representations of the (x,y) coordinates in a horizontal plane of geometric points derived from the features, and wherein a set of such representations obtained during a teaching mode trip along a desired route is stored in a data base and wherein another set of similarly obtained and processed representations of the (x,y) coordinates in a horizontal plane of geometric points derived from the same overhead features obtained during a subsequent automated trip along the same route is compared against the set which was stored in the data base, and wherein the comparison is processed to provide course error signals between the course followed during the teaching mode trip and the course followed during the automated trip, and wherein the course error signals are processed to provide course corrective signals to direct the steering of the vehicle to cause it to follow essentially the same route during the automated trip as was traveled during the teaching mode trip.

20. The guidance system of claim 19 wherein the video camera is mounted with the center axis of its optical system essentially perpendicular to the surface on which the vehicle operates so that the (x) and (y) coordinate information that may be derived from the observed overhead features will apply to a plane essentially parallel to the surface on which the vehicle operates.

21. The guidance system of claim 19 further characterized in that during the teaching mode the vehicle repeatedly measures the height above the video camera of each of the observed overhead features and stores the measurements in the data base.

22. A method for guiding a vehicle through a desired path in a building having an existing overhead with a discernible pattern made up of various elements generally arranged in a horizontal plane, including the steps of manually guiding the vehicle through the desired path in a first pass, recording the locations of geometric points derived from the various elements of the pattern from the vehicle from time to time while the vehicle is being so moved to establish an X and Y axis recording analogous to the desired path, thereafter causing the vehicle to move unattended through the desired path in the building, observing the locations of geometric points derived from the various elements of the pattern from the vehicle as it moves along the desired path to obtain X-axis errors, angular orientation errors and position along the Y-axis, and correcting the direction of the vehicle from time to time in accordance with the obtained X-axis errors and angular orientation errors when the vehicle departs from the desired path as detected from the recorded locations of geometric points derived from the various elements of the existing pattern.

23. The method of claim 22 further characterized in that the vehicle is substantially continuously maintained on the desired path during unattended movement by observing the locations of the various elements of the pattern and correcting the direction of the vehicle when it departs from the desired path.

24. A method of guiding a vehicle through a desired path on a generally planar surface in spaced relation to and under a generally overhead environment comprising discernable contrasting areas, including the steps of manually guiding the vehicle through a desired path on the planar surface in a preliminary pass, from time to time observing from the vehicle the coordinates in a plane parallel to the said surface of a geometric point associated with each of selected contrasting areas of the overhead environment while the vehicle is being so guided to establish a recording analogous to the desired path, thereafter causing the vehicle to move on an unattended pass through the desired path on the planar surface while observing the overhead environment from the vehicle and determining the coordinates in a plane parallel to said surface of the same geometric point associated with each of the same contrasting areas whose coordinates were observed during the preliminary pass, and correcting the direction of the vehicle from time to time when it departs from the desired path as detected from a comparison of the coordinates of the geometric points associated with the selected overhead contrasting areas obtained during the preliminary pass with coordinates of the same geometric points obtained during the unattended pass.

25. The method of claim 24 further characterized in that the coordinates of the geometric point associated with each of the contrasting areas selected from the overhead environment are in a plane generally parallel to the planar surface on which the vehicle is operating.

26. The method of claim 24 further characterized by and including the step of using existing overhead lights in an existing building as the discernable contrasting areas.

27. A method of guiding a vehicle along a desired path on a generally planar surface including the steps of defining a desired path for the vehicle on the planar surface, moving the vehicle along the desired path, from time to time observing primarily upwardly from the vehicle overhead contrasting areas while it is being so moved, making a record on the vehicle of the (x,y) coordinates of geometric points derived from such overhead contrasting areas while it is being so moved, thereafter causing the vehicle to move on its own along the desired path, observing the overhead contrasting areas while it is so moving on its own, and from time to time correcting the direction of the vehicle when it departs from the desired path based upon a comparison of the (x,y) coordinates of geometric points derived from the overhead contrasting areas observed during self-movement with the record made while guiding the vehicle along the desired path.

28. The method of claim 27 further characterized in that the vehicle is substantially continuously maintained on the desired path by correcting the direction of the vehicle when it departs from the desired path based upon the observation of the overhead contrasting areas.

29. A method of operating a vehicle having a frame supported on wheels in which the vehicle automatically follows a predetermined path, including the steps of:

moving the vehicle, under operator command, over a desired path in an area unmodified for the specific use of guiding an unmanned vehicle while making a record analogous to the movement of the vehicle as such movement relates to fixed previously existing generally overhead contrasting visible areas as seen by recording means on the vehicle sensitive to such contrasting visible areas so as to record at the same time both the X and Y axis coordinates of points derived from the contrasting visible areas analogous to the desired path, thereafter moving the vehicle, without operator control, over the desired path, the vehicle being maintained, for at least a portion of its movement, on the desired path by comparison between the analogous record and the vehicle path of movement as such movement relates to the X and Y axis coordinates of points derived from the fixed previously existing generally overhead contrasting visible areas as seen by the recording means to provide simultaneously $E_x$, $E_y$ and $E_a$ where $E_x$ is lateral error, $E_y$ is position along the desired path relative to a reference set of contrasting visible areas, and $E_a$ is angular orientation error, and making vehicle course corrections based upon the observed $E_x$ and $E_a$ to cause the vehicle to follow the desired path, and wherein the vehicle can, for a portion of its movement, be maintained on the desired path during the unmanned moving step by position mode control based on wheel count.

30. A method of operating a vehicle in which the vehicle automatically follows a predetermined path, including the steps of:

moving the vehicle, under operator command, over a desired path in an area unmodified for the specific use of guiding an unmanned vehicle while making a record analogous to the movement of the vehicle as such movement relates to fixed previously existing generally overhead contrasting visible areas as seen by a video camera on the vehicle sensitive to such contrasting visible areas so as to record at the same time both the X and Y axis coordinates of points derived from the contrasting visible areas analogous to the desired path, and thereafter moving the vehicle, without operator control, over the desired path, the vehicle being maintained on the desired path by comparison between the analogous record and the vehicle path of movement as such movement relates to the X and Y axis coordinates of points derived from the fixed previously existing generally overhead contrasting visible areas as seen by the video camera to provide simultaneously $E_x$, $E_y$ and $E_a$ where $E_x$ is lateral error, $E_y$ is position along the desired path relative to a reference set of contrasting visible areas, and $E_a$ is angular orientation error, correcting for any video camera lens distortion prior to comparing the vehicle path of movement with the analogous record, and making vehicle course corrections based upon the observed $E_x$ and $E_a$ to cause the vehicle to follow the desired path.

31. A vehicle used primarily for unmanned operation having a frame supported on wheels and including operator controls for driving the vehicle along a path determined by an operator in an area unmodified for the specific use of guiding an unmanned vehicle, means for recording the operator-determined path as it relates to fixed randomly disposed generally overhead contrasting visible areas in the locality where the vehicle operates as the vehicle is being driven over the operator-determined path so as to record at the same time both the X and Y axis coordinates of the overhead features analogous to the predetermined path, means for controlling movement of the vehicle, without operator control, including means for determining the actual position of the vehicle relative to the fixed randomly disposed contrasting visible areas of unspecified location in the locality where the vehicle operates, means for comparing the actual position of the vehicle thus determined with the desired recorded position of the vehicle to determine lateral error, angular error and position along the desired path, means for making vehicle course corrections when the actual path of the vehicle deviates from the recorded path, and means for controlling vehicle movement by position mode control based on wheel count.

32. The combination comprising a vehicle intended primarily for unmanned operation, having a frame supported on two independently driven wheels and one or more freely swiveling caster wheels, drive means for propelling the vehicle and steering means for steering it, means for operating said vehicle in a manual teaching mode in an area unmodified for the specific use of guiding an unmanned vehicle and along a desired course that an operator of the vehicle wants it to follow in a subsequent unmanned mode, a generally vertically directed video camera mounted on the vehicle, image processing means connected to the video camera, computer means including a memory connected to the image processing means, means for successively selecting sets of two or more defined features in the surroundings generally above the vehicle in the field of view of the video camera as the vehicle is operated along the desired course in the teaching mode, observing such features with the video camera, obtaining successive representations of the locations of points derived from the features in the sets of two or more features from the observations so as to obtain simultaneously both the X and Y axis coordinates of points derived from the said defined features analogous to the desired path, and electronically recording these successive representations in the computer memory, means for positioning the vehicle close to or at the start of the same desired course after the teaching mode is complete and starting the vehicle in unmanned operation with the video camera again observing the same sets of two or more features generally above the vehicle, means for obtaining successive representations of the locations of the same points derived from the same features in the same sets of two or more features as were observed while operating in the teaching mode and comparing such representations with the location representations recorded while operating in the teaching mode to simultaneously provide lateral positional error (Ex) on the X axis, position on the Y axis and angular orientation error (Ea), means for deriving course corrective signals from the comparisons and means to apply the course corrective signals for the X-axis error and angular orientation error to the steering means of the vehicle so as to maintain the unmanned vehicle on a course essentially the same as the course which was traveled during the teaching mode, and means for steering by rotating the driven wheels at speeds which may be expressed as:

$$V = Vm \pm (K1Ex + K2Ea)$$

where V is the peripheral speed of either driven wheel, Vm is the mean velocity of the vehicle, K1 and K2 are constants of proportionality, and ± indicates steering to right or left.

33. A guidance system for a primarily automated vehicle which operates on a generally horizontal surface wherein a video camera mounted on the vehicle is used to successively observe certain overhead contrasting randomly positioned features generally above the vehicle, which observed overhead features comprise a succession of single features which are successively observed one at a time as the vehicle progresses along a desired route, and wherein the camera images of those features are processed into digital representations of the (x,y) coordinates in a horizontal plane of points derived from the features, and wherein a set of such representations obtained during a teaching mode trip along a desired route is stored in a data base and wherein another set of similarly obtained and processed representations of the points derived from the same overhead features obtained during a subsequent automated trip along the same route is compared against the set which was stored in the data base, and wherein the comparison is processed to provide course error signals between the course followed during the teaching mode trip and the course followed during the automated trip, and wherein the lateral position error Ex of the vehicle relative to the desired route and the longitudinal location of the vehicle Ey relative to a selected point along the desired route are determined from each of these successive comparisons, and wherein the angular heading error Ea of the vehicle relative to the desired route is determined as $$Ea = \tan^{-1} (dEx/dEy)$$

where dEx is the difference between the value of Ex as determined for two successive observations and dEy is the distance travelled between the same two successive observations, and wherein the course error signals are processed to provide course corrective signals to direct the steering of the vehicle to cause it to follow essentially the same route during the automated trip as was traveled during the teaching mode trip.

34. A guidance system for a primarily automated vehicle which operates on a generally horizontal surface wherein a video camera mounted on the vehicle is used to successively observe certain overhead contrasting randomly positioned features generally above the vehicle and wherein the camera images of those features are processed into digital representations of the (x,y) coordinates in a horizontal plane of points derived from the features, and wherein a set of such representations obtained during a teaching mode trip along a desired route is stored in a data base and wherein prior to or in connection with the teaching mode, the height above the video camera of a representative observed overhead feature is measured and that measurement is entered into the data base, and wherein another set of similarly obtained and processed representations of the points derived from the same overhead features obtained during a subsequent automated trip along the same route is compared against the set which was stored in the data base, and wherein the comparison is processed to provide course error signals between the course followed during the teaching mode trip and the course followed during the automated trip, and wherein the course error signals are processed to provide course corrective signals to direct the steering of the vehicle to cause it to follow essentially the same route during the automated trip as was traveled during the teaching mode trip.

35. A guidance system for a primarily automated vehicle which operates on a generally horizontal surface wherein a video camera mounted on the vehicle is used to successively observe certain overhead contrasting randomly positioned features generally above the vehicle and wherein the camera images of those features are processed into digital representations of the (x,y) coordinates in a horizontal plane of points derived from the features, and wherein a set of such representations obtained during a teaching mode trip along a desired route is stored in a data base and wherein another set of similarly obtained and processed representations of the points derived from the same overhead features obtained during a subsequent automated trip along the same route is compared against the set which was stored in the data base, and wherein the comparison is processed to provide course error signals between the course followed during the teaching mode trip and the course followed during the automated trip, and wherein an angular error (Ea) in heading of the said vehicle during an automated trip relative to a desired route is equal to the angular difference between the slope of a line connecting the images of the points derived from two features in a pattern obtained during the automated trip and the slope of a line connecting the images of the points derived from the same two features in a pattern obtained during a previous teaching mode trip along the same desired route, and wherein the course error signals are processed to provide course corrective signals to direct the steering of the vehicle to cause it to follow essentially the same route during the automated trip as was traveled during the teaching mode trip.

36. A guidance system for a primarily automated vehicle which operates on a generally horizontal surface wherein a video camera mounted on the vehicle is used to successively observe certain overhead contrasting randomly positioned features generally above the vehicle and wherein the camera images of those features are processed into digital representations of the (x,y) coordinates in a horizontal plane of points derived from the features, and wherein a set of such representations obtained during a teaching mode trip along a desired route is stored in a data base and wherein another set of similarly obtained and processed representations of the points derived from the same overhead features obtained during a subsequent automated trip along the same route is compared against the set which was stored in the data base, and wherein the comparison is processed to provide course error signals between the course followed during the teaching mode trip and the course followed during the automated trip, and wherein the angular orientation of a pattern of the points derived from the features images obtained during an automated trip along a desired route is compared to the angular orientation of a pattern of the points derived from the same feature images obtained during a previous teaching mode trip along the same desired route, and the pattern obtained during the said automated trip is mathematically rotated by an amount equal to the angular difference between the two patterns so that after the rotation a line connecting the points derived from the two features in one of the patterns will be parallel to a line connecting the points derived from the same two features in the other pattern, and wherein the course error signals are processed to provide course corrective signals to direct the steering of the vehicle to cause it to follow essentially the same route during the automated trip as was traveled during the teaching mode trip.

37. The guidance system of claim 36 wherein the lateral positional error (Ex) of the vehicle perpendicular to a desired route during an automated trip is found by a comparison between the lateral offset of the (x) coordinate of the point derived from one or more features in the pattern obtained during the said automated trip and the (x) coordinate of the point derived from the same one or more features in the pattern obtained during a previous teaching mode trip along the said desired route, said comparison being made after the feature pattern obtained during the automated trip has been rotated.

38. The guidance system of claim 36 wherein at a given time the longitudinal location of said vehicle along the desired route may be expressed as the difference (Ey) between the current longitudinal location along the route of the image of the point derived from one or more features in a pattern currently obtained during said automated trip and the longitudinal position along the route of the image of the point derived from the same one or more features in a pattern obtained during a teaching mode trip along the same desired route, said difference being taken after the feature pattern obtained during the automated trip has been routed.

39. The guidance system of claim 38 wherein the value of Ey in a particular pattern approaches zero as the vehicle progresses along the desired route, and wherein new reference patterns of the points derived from overhead features are successively recalled from memory when the value of Ey in each pattern approaches close to zero.

40. A method for guiding a vehicle having a frame supported on wheels through a desired path in a building having an existing overhead with a discernible pattern made up of various elements generally arranged in a horizontal plane, including the steps of manually guiding the vehicle through the desired path in a first pass, recording the locations of points derived from the various elements of the pattern observed from the vehicle from time to time while the vehicle is being so moved to establish an X and Y axis recording analogous to the desired path, thereafter causing the vehicle to move unattended through the desired path in the building, determining the locations of points derived from the various elements of the pattern observed from the vehicle as it moves along the desired path to obtain X-axis errors, angular orientation errors and position along the Y-axis, correcting the direction of the vehicle from time to time in accordance with the obtained X-axis errors and angular orientation errors when the vehicle departs from the desired path as detected from the recorded locations of points derived from the various elements of the existing pattern, and at times correcting the direction of the vehicle by position mode control based on wheel count.

41. A method of guiding a vehicle through a desired path on a generally planar surface in spaced relation to and under a generally overhead environment comprising discernible contrasting areas, including the steps of manually guiding the vehicle through a desired path on the planar surface in a preliminary pass, measuring the height above the vehicle of a contrasting area during the preliminary pass and establishing a recording of said height, from time to time while the vehicle is being so guided observing the contrasting areas from the vehicle, and determining with use of the recorded height the coordinates in a plane parallel to the said surface of a point associated with each of selected contrasting areas of the overhead environment to establish a recording analogous to the desired path, thereafter causing the vehicle to move on an unattended pass through the desired path on the planar surface while observing the overhead environment from the vehicle and determining with use of the recorded height the coordinates in a plane parallel to said surface of the same point associated with each of the same contrasting areas whose coordinates were determined during the preliminary pass, and correcting the direction of the vehicle from time to time when it departs from the desired path as detected from a comparison of the coordinates of the points associated with the selected overhead contrasting areas obtained during the preliminary pass with coordinates of the same points obtained during the unattended pass.

42. A method of guiding a vehicle having a frame supported on wheels along a desired path on a generally planar surface, including the steps of defining a desired path for the vehicle on the planar surface, moving the vehicle along the desired path, from time to time observing primarily upwardly from the vehicle overhead contrasting areas while it is being so moved, making a record on the vehicle derived from the observations of such overhead contrasting areas while it is being so moved, thereafter causing the vehicle to move on its own along the desired path, observing the overhead contrasting areas while it is so moving on its own, from time to time correcting the direction of the vehicle when it departs from the desired path based upon observations of the overhead contrasting areas and wherein the vehicle may at times be maintained on the desired path by position mode control based on wheel count.

43. A method for guiding a vehicle having a frame mounted on wheels through a desired path in a building having an existing overhead with a discernible pattern made up of various elements generally arranged in a horizontal plane, including the steps of manually guiding the vehicle through the desired path in a first pass, recording the locations of points derived from the various elements of the pattern observed from the vehicle from time to time while the vehicle is being so moved to establish and X and Y axis recording analogous to the desired path, thereafter causing the vehicle to move unattended through the desired path in the building, determining the locations of points derived from the various elements of the pattern observed from the vehicle as it moves along the desired path to obtain X-axis errors, angular orientation errors and position along the Y-axis, and at times correcting the direction of the vehicle in accordance with the obtained X-axis errors and angular orientation errors when the vehicle departs from the desired path as detected from the recorded locations of points derived from the various elements of the existing pattern and at other times maintaining the vehicle on the desired path by position mode control based on wheel count.

* * * * *